United States Patent [19]

Yamamoto et al.

[11] Patent Number: 5,102,941
[45] Date of Patent: Apr. 7, 1992

[54] THERMOPLASTIC POLYESTER RESIN COMPOSITION

[75] Inventors: Naoki Yamamoto; Hiroshi Mori; Akira Nakata, all of Otake, Japan

[73] Assignee: Mitsubishi Rayon Co., Ltd., Tokyo, Japan

[21] Appl. No.: 510,672

[22] Filed: Apr. 18, 1990

[30] Foreign Application Priority Data

Apr. 19, 1989 [JP] Japan .................................. 1-97418

[51] Int. Cl.$^5$ ................................................ C08J 3/20
[52] U.S. Cl. ..................................... 524/425; 525/446
[58] Field of Search ........................ 525/446; 524/425

[56] References Cited

U.S. PATENT DOCUMENTS

| | | | |
|---|---|---|---|
| 4,013,613 | 3/1977 | Abolins et al. | 260/40 R |
| 4,393,156 | 7/1983 | Miller | 524/114 |
| 4,742,109 | 5/1988 | Takahashi et al. | 524/504 |
| 4,775,712 | 10/1988 | Sasaki et al. | 524/504 |

FOREIGN PATENT DOCUMENTS 20279513 8/1988 European Pat. Off. .

OTHER PUBLICATIONS

Encyclopedia of Polymer Science and Eng., vol. 8, pp. 65 to 67 (1987).

*Primary Examiner*—Malvyn I. Marquis
*Assistant Examiner*—D. E. Aylward
*Attorney, Agent, or Firm*—Oblon, Spivak, McClelland, Maier & Neustadt

[57] ABSTRACT

Disclosed is a thermoplastic polyester resin composition, which comprises (A) 99-60 parts by weight of a thermoplastic polyester resin, (B) 1-40 parts by weight of a polyorganosiloxane rubber, (C) 0.01-10 parts by weight, per 100 parts by weight of the sum of the components (A) and (B), of an organic silane compound having at least one functional group selected from the group consisting of an epoxy group, and isocyanate group and an amino group, and (D) 0-300 parts by weight, per 100 parts by weight of the sum of the components (A) and (B), of a reinforcing filler. This composition results in a shaped article having an improved impact resistance while retaining good heat stability and weatherability inherently possessed by the thermoplastic polyester.

8 Claims, No Drawings

THERMOPLASTIC POLYESTER RESIN COMPOSITION

BACKGROUND OF THE INVENTION

1. Field of the Invention

The present invention relates to a thermo-plastic polyester resin composition having an improved impact resistance. More particularly, relates to a thermoplastic polyester resin composition having an excellent impact resistance, which comprises a thermo-plastic polyester resin and, incorporated therein, a polyorganosiloxane rubber, a specific organic silane compound and optionally, a reinforcing filler.

2. Description of the Related Art

Since a thermoplastic polyester, for example, a polyalkylene terephthalate, has excellent physical properties, heat stability, weatherability and electrically insulating properties, the thermoplastic polyester is widely used for electrical and electronic parts, automobile parts and the like. However, the application fields are considerably restricted because the impact resistance, especially the notched impact strength, is low. Various processes have been proposed for improving the impact resistance of the thermoplastic polyester resin. These processes are satisfactory to some extent in the improvement of the impact strength, but other characteristics are sacrificed, and these processes are not practically applicable. For example, the impact resistance can be improved by incorporating a diene rubber reinforcing resin into a thermoplastic polyester resin, but the heat stability and weatherability are drastically degraded. In contrast, if an acrylic rubber reinforcing resin is incorporated into a thermoplastic polyester resin, reduction of the weatherability is not conspicuous, but no substantial effect of improving the impact strength at low temperatures is obtained. Moreover, incorporation of an olefin copolymer is effective for improving the impact resistance, but other mechanical properties are degraded, or the dispersibility is poor and laminar separation is caused. Accordingly, this process cannot be practically adopted.

SUMMARY OF THE INVENTION

The primary object of the present invention is to provide a thermoplastic polyester having an improved impact resistance while retaining excellent heat stability and weatherability inherently possessed by the thermoplastic polyester.

In accordance with the present invention, there is provided a thermoplastic polyester resin composition, which comprises (A) 99 to 60 parts by weight of a thermoplastic polyester resin, (B) 1 to 40 parts by weight of a polyorganosiloxane rubber, (C) 0.01 to 10 parts by weight, per 100 parts by weight of the sum of the components (A) and (B), of an organic silane compound having at least one functional group selected from the group consisting of an epoxy group, an isocyanate group and an amino group, and (D) 0 to 300 parts by weight, per 100 parts by weight of the sum of the components (A) and (B), of a reinforcing filler.

DESCRIPTION OF THE PREFERRED EMBODIMENTS

The thermoplastic polyester (A) used in the present invention is composed mainly of units derived from an aromatic dicarboxylic acid having 8 to 22 carbon atoms and units derived from an alkylene glycol, cycloalkylene glycol or aralkylene glycol having 2 to 22 carbon atoms. The thermoplastic polyester (A) may contain a minor amount of units derived from an aliphatic dicarboxylic acid such as adipic acid or sebacic acid, or a minor amount of units derived from a polyalkylene glycol such as polyethylene glycol or polytetramethylene glycol. Polyethylene terephthalate, polybutylene terephthalate (polytetramethylene terephthalate), polycyclohexylenedimethylene terephthalate, and a copolymer comprising main structural units of cyclohexylenedimethylene terephthalate and a comonomer such as ethylene glycol or isophthalic acid, are especially preferably used as the thermoplastic polyester in the present invention.

The kind of the polyorganosiloxane rubber (B) used in the present invention is not particularly critical. However, a polyorganosiloxane rubber having an average particle diameter of 0.1 to 0.5 $\mu$m and a swelling degree of 3 to 50 as measured in toluene as the solvent, which is formed by copolymerizing an organosiloxane with a crosslinking agent, is preferably used in the present invention.

As the organosiloxane constituting the polyorganosiloxane rubber (B), there can be mentioned, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. These organosiloxanes can be used alone or in the form of a mixture of two or more thereof. Among polyorganosiloxane rubbers obtained by using these organosiloxanes, a rubber composed mainly of polydimethylsiloxane is especially preferably used. The amount of the organosiloxane used is at least 50% by weight, preferably at least 70% by weight, in the polyorganosiloxane rubber.

As the crosslinking agent used for the preparation of the polyorganosiloxane rubber, there can be mentioned trifunctional or tetrafunctional siloxane crosslinking agents such as trimethoxymethylsilane, triethoxyphenylsilane, tetramethoxysilane, tetraethoxysilane, and tetrabutoxysilane. The amount of the crosslinking agent used is 0.2 to 30% by weight based on the obtained polyorganosiloxane rubber, and the amount of the crosslinking agent used is preferably adjusted so that the swelling degree of the polyorganosiloxane (the weight ratio of toluene absorbed in the polyorganosiloxane rubber to the dry polyorganosiloxane rubber when the polyorganosiloxane rubber is saturated with toluene as the solvent at 25° C.) is in the range of from 3 to 50. If the swelling degree is lower than 3, the amount of the crosslinking agent is too large, and the rubbery elasticity is difficult to obtain. If the swelling degree is higher than 50, the rubbery state is difficult to maintain and a satisfactory impact resistance cannot be imparted.

The swelling degree is measured according to the following method. Namely, the polyorganosiloxane rubber obtained by polymerization is incorporated into isopropyl alcohol in an amount about 3 to about 5 times the amount of the polyorganosiloxane rubber with stirring to destroy the emulsion and effect coagulation, whereby a siloxane polymer is obtained. The obtained polymer is washed with water and dried at 80° C. for 10 hours under a reduced pressure. After the drying, about 1 g of the polymer is precisely weighed and immersed into about 60 g of toluene, and the polymer is allowed to stand at 25° C. for 100 hours to effect swelling. The remaining toluene is separated and removed by decantation and the residue is precisely weighed. Then the residue was maintained at a temperature of 80° C. under a reduced pressure for 16 hours whereby the absorbed toluene is removed, and thereafter, the residue is precisely weighed again. The swelling degree is calculated according to the following formula:

$$\text{Swelling degree} = \frac{\text{(weight swollen polymer)} - \text{(weight of dry polymer)}}{\text{(Weight of dry polymer)}} \times 100$$

The polymerization for the production of this polyorganosiloxane rubber can be carried out according to processes disclosed, for example, in U.S. Pat. No. 2,891,920 and U.S. Pat. No. 3,294,725. According to a preferred example of the polymerization process, a mixed solution of an organosiloxane and a crosslinking agent is mixed with water under shearing in the presence of an emulsifier such as an alkylbenzenesulfonate or alkylsulfonate. The alkylbenzenesulfonate is preferably used because it acts not only as the emulsifier for the organosiloxane but also as the polymerization initiator. If a metal salt of an alkylbenzenesulfonic acid or a metal salt of an alkyl sulfonic acid is used in combination with the emulsifier, an effect of keeping the latex stable can be obtained.

If the average particle diameter of the polyorganosiloxane rubber is smaller than 0.1 μm or larger than 0.5 μm, it sometimes happens that a satisfactory impact resistance is not manifested. The average particle diameter of the polyorganosiloxane rubber is measured according to the quasielastic light scattering method (the measurement apparatus is Malvern System 4600, the measurement temperature is 25° C. and the scattering angle is 90°) using a sample liquid formed by diluting the rubber latex with water.

The mixing ratio of the thermoplastic polyester resin (A) to the polyorganosiloxane rubber (B) is such that the amount of the thermoplastic polyester is 99 to 60 parts by weight and the amount of the polyorganosiloxane rubber is 1 to 40 parts by weight based on 100 parts by weight of the sum of the two components. If the amount of the polyorganosiloxane rubber is too small, the effect of improving the impact resistance is low, and if the amount of the polyorganosiloxane rubber is too large, the molding processability is poor.

The organic silane compound (C) having a specific functional group, which is used in the present invention, is a compound having at least one functional group selected from the group consisting of an epoxy group, an isocyanate group and an amino group and having at least one alkoxy group represented by the formula RO— (in which R represents an alkyl group) or at least one chlorine atom, bonded to the silicon atom. As specific examples of the organic silane compound, there can be mentioned, for example, β-(3,4-epoxycyclohexyl)ethyltrimethoxysilane, γ-glycidoxypropyltrimethoxysilane, γ-glycidoxypropylmethyldiethoxysilane, N-β(aminoethyl)-γ-aminopropyltrimethoxysilane, N-β(aminoethyl)-γ-aminopropylmethyldimethoxysilane, γ-aminopropyltriethoxysilane, N-phenyl-γ-aminopropyltrimethoxysilane, γ-isocyanopropyltrimethoxysilane, γ-isocyanopropylmethyldimethoxysilane, γ-isocyanopropyltriethoxysilane, and γ-isocyanopropylmethyltriethoxysilane.

The amount of the organic silane compound incorporated is 0.01 to 10 parts by weight per 100 parts by weight of the sum of the thermoplastic polyester resin and the polyorganosiloxane rubber. If the amount of the organic silane compound is smaller than 0.01 part by weight, no satisfactory impact resistance is manifested, and if the amount of the organic silane compound is larger than 10 parts by weight, bad influences are imposed on the flowability at the molding and processing steps.

Various fillers can be mentioned as the reinforcing filler (D) used according to need in the present invention. For example, there can be mentioned fibrous fillers such as glass fibers, carbon fibers, aramid fibers, metal fibers, asbestos fibers, and whiskers, and spherical, plate-like, indeterminate or granular natural or synthetic fillers such as glass beads, glass flakes, calcium carbonate, talc, mica, aluminum oxide, magnesium hydroxide, boron nitride, beryllium oxide, calcium silicate, clay, and metal powders. These fillers can be used alone or in the form of a mixture of two or more thereof.

The filler exerts an effect of reinforcing the mechanical properties, especially the rigidity and heat resistance. A polyester resin containing a reinforcing filler is well known, but addition of the filler often results in reduction of the impact resistance. Since the reinforced resin composition of the present invention has good impact resistance and heat stability, the improvement of the heat resistance by the reinforcer is effectively utilized. The amount of the reinforcing filler incorporated is preferably up to 300 parts by weight per 100 parts by weight of the sum of the thermoplastic polyester resin and the polyorganosiloxane rubber.

The composition of the present invention may further comprise dyes and pigments, light or heat stabilizers, known flame retardants such as a brominated epoxy compound, a brominated polycarbonate, decabromodiphenyl ether and antimony oxide, crystal nucleating agents, various modifiers, and release agents such as waxes, according to need.

The polyester resin composition of the present invention can be prepared by mixing the respective components according to a known method, and the polyester resin composition of the present invention can be formed into an optional shaped article according to the known extrusion method or molding method.

The present invention will now be described in detail with reference to the following examples.

In the examples and comparative examples, all of "parts" are by weight.

In the examples and comparative examples, the Izod impact strength was measured under the following four testing conditions.

(i) Ambient Temperature Impact Test

The Izod impact strength was measured at 23° C. according to the method of ASTM D-256 (⅛" notched).

(ii) Low Temperature Impact Test

The Izod impact strength was measured at −30° C. according to the method of ASTM D-256 (⅛" notched).

(iii) Thermal Deterioration Impact Test

A specimen was maintained at 120° C. for hours in a gear type heating tester according to the method of ASTM D-573-32, and thereafter, the Izod impact strength (⅛" notched) was measured.

(iv) Weathering Impact Test

A specimen was subjected to exposure test for 300 hours using Sunshine Long-life weather Meter, WEL-SUN-HC type (supplied by Suga Test Instruments Co., Ltd., black panel temperature 83° C., light-water spray cycle), and thereafter, the Izod impact strength was measured according to ASTM D-256 (⅛" notched).

Referential Example 1

Preparation of Polyorganosiloxane Graft Copolymer (S-1)

A siloxane mixture (100 parts) was prepared by mixing 2 parts of tetraethoxysilane and 98 parts of octamethylcyclotetrasiloxane. To 100 parts of the siloxane mixture was added 200 parts of distilled water having dissolved therein 1 part of sodium dodecylbenzenesulfonate and 1 part of dodecylbenzenesulfonate. The mixture was preliminarily stirred at 10,000 rpm by a homomixer, and the mixture was passed through a homogenizer under a pressure of 200 kg/cm² three times to effect emulsification and dispersion and obtain an organosiloxane latex. The liquid mixture was transferred to a separable flask equipped with a condenser and stirring vanes, and the liquid mixture was heated at 80° C. for 6 hours with stirring, and the liquid mixture was cooled by standing at 10° C. for 20 hours. Then, the obtained latex was neutralized with an aqueous solution of sodium hydroxide so the pH value was 6.9, whereby the polymerization was completed. The polymerization ratio of the obtained polyorganosiloxane rubber was 91.2%, the swelling degree was 23, and the particle diameter of the polyorganosiloxane rubber was 0.24 μm.

REFERENTIAL EXAMPLE 2

Preparation of Polyorganosiloxane Rubbers (S-2) through (S-11)

Polyorganosiloxane rubbers were prepared in the same manner as described in Referential Example 1 except that the conditions were changed as shown in Table 1. The results are shown in Table 1.

REFERENTIAL EXAMPLE 3

Preparation of Polybutadiene Graft Copolymer (S-12)

For comparison, a polybutadiene graft copolymer (S-12) was prepared as follows.

A fine liter reactor provided with a stirrer was charged with 140 parts of a polybutadiene latex (11A supplied by Nippon Zeon Co., polymer content 50% by weight, average particle diameter 0.3 μm), 70 parts of water, 2 parts of potassium oleate, 0.005 part of ferrous sulfate, 0.02 part of sodium pyrophosphate, and 0.03 part of dextrose. Then a mixture of 21 parts of styrene, 9 parts of acrylonitrile, and 0.02 part of cumene hydroperoxide was dropped into the reactor under agitation in a nitrogen atmosphere over a period of 2 hours, which was maintained at 80° C. in a water bath. Thereafter, the resulting mixture was maintained at 80° C. for 2 hours with stirring to complete polymerization. One part of 2,2'-methylenebis(4-methyl-6-tert.butylphenol) was added to the thus-prepared latex and then the latex was poured into 500 parts of a 5% aqueous solution of magnesium sulfate with stirring to effect precipitation. The solid precipitate was separated, washed and dried at 80° C. for 10 hours to yield a dry powder of a polybutadiene graft copolymer (S-12).

REFERENCE EXAMPLE 4

Preparation of Polybutyl Acrylate Graft Copolymer (S-13)

For comparison, a polybutyl acrylate graft copolymer (S-13) was prepared as follows.

A five liter reactor provided with a stirrer was charged with 140 parts of water, 1 part of sodium dodecylbenzenesulfonate, 0.005 part of ferrous sulfate, 0.015 part of sodium ethylenediaminetetraacetate, and 0.03 part of Rongalit. Then a mixture of 68 parts of butyl acrylate, 2 parts of allyl methacrylate, and 0.1 part of cumene hydroperoxide was dropped into the reactor under agitation in a nitrogen atmosphere over a period of 2 hours, which was maintained at 80° C. in a water bath. Thereafter, the resulting mixture was maintained at 80° C. for 1 hour with stirring, a mixture of 21 parts of styrene, 9 parts of acrylonitrile, and 0.05 part of cumene hydroperoxide was dropped into the reactor over a period of 2 hours, and the resulting mixture was maintained at 80° C. for 1 hour with stirring to complete polymerization. The thus-prepared latex was poured into 500 parts of a 1% aqueous solution of calcium chloride with stirring to effect precipitation. The solid precipitate was separated, washed and dried at 80° C. for 10 hours to yield a polybutyl acrylate graft copolymer (S-13).

EXAMPLES 1 THROUGH 3

A polycyclohexylenedimethylene terephthalate resin having an intrinsic viscosity [η] of 0.8, which was obtained by melt-polymerizing dimethyl terephthalate and

TABLE 1

| | Polyorganosiloxane Rubber | | | | | | | | | |
|---|---|---|---|---|---|---|---|---|---|---|
| | S-2 | S-3 | S-4 | S-5 | S-6 | S-7 | S-8 | S-9 | S-10 | S-11 |
| Tetraethoxysilane (parts) | 98 | 98 | 98 | 98 | 99 | 95 | 99.3 | 85 | 99.7 | 98 |
| Octamethylcyclotetrasiloxane (parts) | 2 | 2 | 2 | 2 | 1 | 15 | 0.5 | 35 | 0.1 | 2 |
| Pressure of homogenizer (kg/cm²) | 200 | 200 | 100 | 350 | 200 | 200 | 200 | 200 | 200 | 350 |
| Passage frequency (times) | 1 | 5 | 1 | 5 | 3 | 3 | 3 | 3 | 3 | 10 |
| Polymerization conversion (%) | 91 | 91 | 91 | 91 | 91 | 91 | 91 | 91 | 91 | 91 |
| Swelling degree | 22 | 23 | 23 | 23 | 34 | 6 | 42 | 1 | 60 | 23 |
| Particle diameter (μm) | 0.28 | 0.20 | 0.33 | 0.13 | 0.24 | 0.23 | 0.25 | 0.23 | 0.26 | 0.05 |

1,4-cyclohexanedimethanol in the presence of tetrabutoxy titanate as the catalyst, was pulverized to an average particle diameter of 100 μm. Then, 300 parts of the polyester was incorporated into 500 parts of the polyorganosiloxane latex (S-1) with stirring to form a dispersion. Then, the dispersion was dropped into 600 parts of a 1% by weight aqueous solution of calcium chloride to effect coagulation. Then, the solid was separated, washed and dried at 80° C. for 10 hours to remove water, whereby a polycyclohexylenedimethylene terephthalate resin composition having the polyorganosiloxane rubber dispersed therein was obtained.

Then, 1 part of a functional group-containing organic silane compound shown in Table 2 was blended into 50 parts of the above-mentioned polycyclohexylenedimethylene terephthalate resin composition having the polyorganosiloxane rubber dispersed therein by a Henschel mixer. Furthermore, the mixture was further blended with 50 parts of the above-mentioned polycyclohexylenedimethylene terephthalate resin ($[\eta]=0.8$). The blend was extruded through a twin-screw extruder having a screw diameter of 30 mm at 300° C. and pelletized. The amount of the polyorganosiloxane rubber in the resin composition constituting the pellet was 20 parts.

The pellet was injection-molded at a cylinder temperature of 300° C. and a mold temperature of 80° C. to obtain an Izod test piece. The impact strength of the test piece was measured and the results are shown in Table 2.

EXAMPLE 4 THROUGH 9

A composition shown in Table 2 was prepared in the same manner as described in Example 1 by using a polycyclohexylenedimethylene terephthalate resin, in which the polyorganosiloxane rubber obtained in Referential Example 1 was dispersed, and in the same manner as described in Example 1, the composition was extruded and injection-molded to obtain an Izod test piece. The impact strength of the test piece was measured and the results are shown in Table 2.

COMPARATIVE EXAMPLES 1 THROUGH 10

For comparison, a composition shown in Table 2 was prepared, extruded and injection-molded in the same manner as described in Example 1, and the obtained test piece was evaluated. The results are shown in Table 2.

COMPARATIVE EXAMPLE 11

When the amount of the organic silane compound was changed to 20 parts in the composition of Example 1 and extrusion of the resulting composition under the same conditions as described in Example 1 was tried, extrusion was impossible because the viscosity was too high.

TABLE 2

| | | Example No. | | | | | | | | | Comparative Example No. | | |
|---|---|---|---|---|---|---|---|---|---|---|---|---|---|
| | | 1 | 2 | 3 | 4 | 5 | 6 | 7 | 8 | 9 | 1 | 2 | 3 |
| Polyorganosiloxane rubber (S-1) (parts) | | 20 | 20 | 20 | 20 | 20 | 5 | 10 | 30 | 20 | 0 | 0 | 20 |
| Polycyclohexylenedimethylene terephthalate (parts) | | 80 | 80 | 80 | 80 | 80 | 95 | 90 | 70 | 80 | 100 | 100 | 80 |
| Organic silane compound*2 (parts) | | A | B | C | A | A | A | A | A | A | — | — | — |
| | | 1 | 1 | 1 | 0.5 | 5 | 1 | 1 | 1 | 1 | — | — | — |
| Filler*1 (parts) | | — | — | — | — | — | — | — | — | 50 | — | 50 | — |
| Izod impact strength (⅛" notched) (kg·cm/cm) | Ambient temperature (23° C.) | 20 | 22 | 18 | 15 | 20 | 8 | 12 | 35 | 16 | 1.5 | 7 | 2.5 |
| | Low temperature (−30° C.) | 16 | 18 | 15 | 13 | 15 | 6 | 10 | 30 | 14 | 0.8 | 5 | 1.0 |
| | Thermal deterioration (120° C., 100 hours) | 19 | 20 | 17 | 15 | 18 | 7 | 11 | 34 | 15 | 1.5 | 6 | 2.5 |
| | Weathering (300 hours) | 18 | 20 | 18 | 14 | 19 | 8 | 11 | 33 | 16 | 1.5 | 6 | 2.5 |

| | | Comparative Example No. | | | | | | |
|---|---|---|---|---|---|---|---|---|
| | | 4 | 5 | 6 | 7 | 8 | 9 | 10 |
| Polyorganosiloxane rubber (S-1) (parts) | | 20 | 0 | 0 | 0 | 0 | 20*3 | 20*4 |
| Polycyclohexylenedimethylene terephthalate (parts) | | 80 | 100 | 100 | 100 | 100 | 80 | 80 |
| Organic silane compound*2 (parts) | | — | A | A | B | C | — | — |
| | | — | 1 | 1 | 1 | 1 | — | — |
| Filler*1 (parts) | | 50 | — | 50 | — | — | — | — |
| Izod impact strength (⅛" notched) (kg·cm/cm) | Ambient temperature (23° C.) | 7 | 1.6 | 8 | 2.0 | 1.7 | 20 | 18 |
| | Low temperature (−30° C.) | 5 | 1.0 | 5 | 0.8 | 0.8 | 18 | 2.5 |
| | Thermal deterioration (120° C., 100 hours) | 6 | 1.5 | 6 | 1.0 | 1.5 | 3 | 16 |
| | Weathering (300 hours) | 7 | 1.5 | 7 | 2.0 | 1.6 | 7 | 14 |

Note
*1Filler: glass fiber
*2Organic silane compound:
A: γ-glycidoxypropyltrimethoxysilane
B: γ-aminopropyltrimethoxysilane
C: γ-isocyanopropyltrimethoxysilane
*3Polybutadiene graft copolymer (S-12) was used instead of (S-1)
*4Polybutyl acrylate graft copolymer (S-13) was used instead of (S-1)

EXAMPLES 10 THROUGH 19

A composition shown in Table 3 was prepared by using the polyorganosiloxane rubber obtained in Referential Example 2 in the same manner as described in Example 1, and the composition was evaluated in the same manner as described in Example 1. The results are shown in Table 3.

TABLE 3

| | Example No. | | | | | | | | | |
|---|---|---|---|---|---|---|---|---|---|---|
| | 10 | 11 | 12 | 13 | 14 | 15 | 16 | 17 | 18 | 19 |
| Polyorganosiloxane rubber (parts) | S-2 | S-3 | S-4 | S-5 | S-6 | S-7 | S-8 | S-0 | S-10 | S-11 |
| | 20 | 20 | 20 | 20 | 20 | 20 | 20 | 20 | 20 | 20 |
| Polycyclohexylenedimethylene terephthalate (parts) | 80 | 80 | 80 | 80 | 80 | 80 | 80 | 80 | 80 | 80 |
| Organic silane compound (parts) | A | A | A | A | A | A | A | A | A | A |
| | 1 | 1 | 1 | 1 | 1 | 1 | 1 | 1 | 1 | 1 |

TABLE 3-continued

|  |  | Example No. | | | | | | | | | |
|---|---|---|---|---|---|---|---|---|---|---|---|
|  |  | 10 | 11 | 12 | 13 | 14 | 15 | 16 | 17 | 18 | 19 |
| Filler* (parts) |  | 50 | 50 | 50 | 50 | 50 | 50 | 50 | 50 | 50 | 50 |
| Izod impact strength (¼" notched) (kg · cm/cm) | Ambient temperature (23° C.) | 17 | 16 | 17 | 14 | 17 | 14 | 15 | 11 | 11 | 10 |
|  | Low temperature (−30° C.) | 14 | 13 | 13 | 12 | 13 | 12 | 12 | 9 | 9 | 8 |
|  | Thermal deterioration (120° C., 100 hours) | 16 | 16 | 15 | 13 | 15 | 13 | 13 | 10 | 10 | 10 |
|  | Weathering (300 hours) | 16 | 15 | 16 | 12 | 16 | 13 | 13 | 10 | 10 | 10 |

Note
*glass fiber

EXAMPLES 20 THROUGH 23 AND COMPARATIVE EXAMPLES 12 through 15

A composition shown in Table 4 was prepared in the same manner as described in Example 1 except that a polyethylene terephthalate resin (PET) having an intrinsic viscosity [η] of 0.7 or a polytetramethylene terephthalate resin (PBT) having an intrinsic viscosity [η] of 0.8 was used instead of the polycyclohexylenedimethylene terephthalate resin, and in the same manner as described in Example 1, the composition was extruded and injection-molded to obtain an Izod test piece. When the polytetramethylene terephthalate resin (PBT) was used, the cylinder temperature at the injection molding was changed to 250° C.

The test piece was evaluated, and the results are shown in Table 4. For comparison, a comparative composition shown in Table 4 was extruded, molded and subjected to the Izod impact test. The results are shown in Table 4.

TABLE 4

|  |  | Example 20 | Example 21 | Comparative Example 12 | Comparative Example 13 | Example 22 | Example 23 | Comparative Example 14 | Comparative Example 15 |
|---|---|---|---|---|---|---|---|---|---|
| Polyorganosiloxane rubber (S-1) (parts) |  | 20 | 20 | — | — | 20 | 20 | — | — |
| Thermoplastic polyester (parts) |  | PET 80 | PET 80 | PET 100 | PET 100 | PBT 80 | PBT 80 | PBT 100 | PBT 100 |
| Organic silane compound (parts) |  | A 1 | A 1 | — | — | A 1 | A 1 | — | — |
| Filler* (parts) |  | — | 50 | — | 50 | — | 50 | — | 50 |
| Izod impact strength (¼" notched) (kg · cm/cm) | Ambient temperature (23° C.) | 24 | 18 | 2.5 | 7 | 27 | 19 | 3 | 8 |
|  | Low temperature (−30° C.) | 19 | 13 | 0.8 | 4 | 20 | 15 | 1.0 | 5 |
|  | Thermal deterioration (120° C., 100 hours) | 22 | 15 | 2.0 | 6 | 24 | 17 | 2 | 7 |
|  | Weathering (300 hours) | 21 | 16 | 2.5 | 6 | 25 | 18 | 2 | 7 |

Note
*glass fiber

The thermoplastic polyester resin composition of the present invention has an improved impact strength, and simultaneously, the composition retains excellent heat resistance, mechanical strength, moldability and flowability inherently possessed by a polyester resin.

We claim:

1. A thermoplastic polyester resin composition, which comprises (A) 99 to 60 parts by weight of a thermoplastic polyester resin, (B) 1 to 40 parts by weight of a polyorganosiloxane rubber, (C) 0.01 to 10 parts by weight, per 100 parts by weight of the sum of the components (A) and (B), of an organic silane compound having at least one functional group selected from the group consisting of an epoxy group, an isocyanate group and an amino group, and (D) 0 to 300 parts by weight, per 100 parts by weight of the sum of the components (A) and (B), of a reinforcing filler.

2. A thermoplastic polyester resin composition according to claim 1, wherein the thermoplastic polyester is comprised of units derived from an aromatic dicarboxylic acid having 8 to 22 carbon atoms and units derived from an alkylene glycol, cycloalkylene glycol or aralkylene glycol having 2 to 22 carbon atoms.

3. A thermoplastic polymer resin composition according to claim 1, wherein the thermoplastic polyester resin (A) is polyethylene terephthalate, polybutylene terephthalate, polycyclohexylenedimethylene terephthalate, or a copolymer predominantly comprised of cyclohexylenedimethylene terephthalate.

4. A thermoplastic polyester resin composition according to claim 1, wherein the polyorganosiloxane rubber is a copolymer of an organosiloxane with a crosslinking agent and has an average particle diameter of 0.1 to 0.5 μm and a swelling degree of 3 to 50 as expressed by the weight ratio of toluene absorbed in the polyorganosiloxane rubber to the dry polyorganosiloxane rubber when the polyorganosiloxane rubber is saturated with toluene at 25° C.

5. A thermoplastic polyester resin composition according to claim 3, wherein the polyorganosiloxane rubber is prepared by copolymerizing at least 50% by weight based on the weight of the polyorganosiloxane, of an organosiloxane selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane, with 0.2 to 30% by weight, based on the weight of the polyorganosiloxane, of a trifunctional or tetrafunctional siloxane crosslinking agent selected from the group consisting of trimethoxymethylsilane, triethoxyphenylsilane, tetramethoxysilane, tetraethoxysilane, and tetrabutoxysilane.

6. A thermoplastic polyester resin composition according to claim 3, wherein the polyorganosiloxane rubber (B) is composed mainly of polydimethylsiloxane.

7. A thermoplastic polyester resin composition according to claim 1, wherein the organic silane compound is a member selected from the group consisting of β-(3,4-epoxycyclohexyl)ethyltrimethoxysilane, γ-glycidoxypropyltrimethoxysilane, γ-glycidoxypropylmethyldiethoxysilane, N-β(aminoethyl)-γ-aminopropyltrimethoxysilane, N-β(aminoethyl)-γ-aminopropylmethyldimethoxysilane, γ-aminopropyltriethoxysilane, N-phenyl-γ-aminopropyltrimethoxysilane, γ-isocyanopropyltrimethoxysilane, γ-isocyanopropylmethyldimethoxysilane, γ-isocyanopropyltriethoxysilane, and γ-isocyanopropylmethyltriethoxysilane.

8. A thermoplastic polyester resin composition according to claim 1, wherein the reinforcing filler is selected from the group consisting of glass fibers, carbon fibers, aramid fibers, metal fibers, asbestos fibers, whiskers, glass beads, glass flakes, calcium carbonate, talc, mica aluminum oxide, magnesium hydroxide, boron nitride, beryllium oxide, calcium silicate, clay, and metal powders.

* * * * *